US007283669B2

(12) United States Patent
Andel et al.

(10) Patent No.: US 7,283,669 B2
(45) Date of Patent: Oct. 16, 2007

(54) FINE SEGMENTATION REFINEMENT FOR AN OPTICAL CHARACTER RECOGNITION SYSTEM

(75) Inventors: Richard S. Andel, Binghamton, NY (US); Edward G. Ovando, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 719 days.

(21) Appl. No.: 10/353,552

(22) Filed: Jan. 29, 2003

(65) Prior Publication Data

US 2004/0146216 A1   Jul. 29, 2004

(51) Int. Cl.
    *G06K 9/34*   (2006.01)
(52) U.S. Cl. ...................... 382/177; 382/178
(58) Field of Classification Search ................ 382/177
    See application file for complete search history.

(56) References Cited

U.S. PATENT DOCUMENTS

| | | | |
|---|---|---|---|
| 4,731,857 A | 3/1988 | Tappert | |
| 5,046,114 A | 9/1991 | Zobel | |
| 5,561,720 A | 10/1996 | Lellmann et al. | |
| 5,644,648 A * | 7/1997 | Bose et al. | 382/177 |
| 5,687,253 A * | 11/1997 | Huttenlocher et al. | 382/177 |
| 5,708,730 A * | 1/1998 | Itonori | 382/177 |
| 5,768,414 A | 6/1998 | Jamali | |
| 5,787,196 A | 7/1998 | Yair et al. | |
| 5,809,166 A | 9/1998 | Huang et al. | |
| 5,825,920 A | 10/1998 | Kitamura et al. | |
| 6,011,865 A * | 1/2000 | Fujisaki et al. | 382/189 |
| 6,081,616 A | 6/2000 | Vaczi et al. | |
| 6,269,171 B1 * | 7/2001 | Gozzo et al. | 382/101 |
| 6,356,655 B1 * | 3/2002 | Sumikawa et al. | 382/175 |

OTHER PUBLICATIONS

"Segmentation of low-quality typewritten digits"; C. Rodriguez, J. Muguerza, M. Navarro, A. Zarate, J. I. Martin and J. M. Perez; 14th International Conference on Pattern Recognition, 1998 Proceedings, vol. 2, 1998, pp. 1106-1109, vol. 2.

(Continued)

Primary Examiner—Wenpeng Chen
Assistant Examiner—Yuzhen Ge
(74) Attorney, Agent, or Firm—Tarolli, Sundheim, Covell & Tummino LLP (57) ABSTRACT

A method and computer program product are disclosed for refining character segmentation in an optical character recognition system receiving as input a plurality of candidate objects. Each candidate object below a threshold character width is merged with another candidate object at one or more merge lines to form a composite object. The plurality of candidate objects are preclassified to identify a plurality of composite objects and a plurality of character portions. Proposed split lines are determined for each of the composite objects. Regions are defined within each of the composite objects from the position of the merge and split lines. The defined regions are classified to obtain an associated score for each region. Complete region sets are defined for each composite object, each with an associated set ranking determined from the associated score of the regions comprising the set. The set having the highest ranking is selected.

16 Claims, 4 Drawing Sheets

OTHER PUBLICATIONS

"Machine printed character segmentation method using side profiles", Min-Chul Jung, Yong-Chul Shin, S. N. Srihari; IEEE International Conference on Systems, Man and Cybernetics, 1999, IEEE SMC '99 Conference Proceedings, 1999, vol. 6, pp. 863-867.

"Efficient algorithms for segmentation and recognition of printed characters in document processing"; S. Liang, M. Shridhar, and M. Ahmadi; IEEE Pacific Rim Conference on Communications, Computers and Signal Processing, 1993, vol. 1, pp. 240-243.

* cited by examiner

FINE SEGMENTATION REFINEMENT FOR AN OPTICAL CHARACTER RECOGNITION SYSTEM

BACKGROUND OF THE INVENTION

1. Technical Field

The invention relates to a method and computer program product for refining the segmentation of digitally scanned text in an optical character recognition (OCR) system. OCR systems rely on pattern recognition devices (classifiers) for character recognition.

2. Description of the Prior Art

Optical character recognition (OCR) is the process of transforming written or printed text into digital information. Pattern recognition classifiers are used in sorting scanned characters into a number of output classes. A typical prior art classifier is trained over a plurality of output classes using a set of training samples. The training samples are processed, data relating to features of interest are extracted, and training parameters are derived from this feature data. During operation, the system receives an input image associated with one of a plurality of classes. The input image is segmented into candidate objects and passed to a classifier. The relationship of each of the candidate objects to each class is analyzed via a classification technique based upon the training parameters. From this analysis, the system produces an output class and an associated confidence value for each of the candidate objects input to the classifier.

Ideally, all samples in an OCR system would be properly segmented into recognizable characters. In practice, however, a number of characters will be improperly split or merged by the segmentation process. Even a small error in the printing or writing of the original or in the scanning of the sample can result in improper segmentation. In most systems, improperly segmented characters will not be recognized by the classifier, necessitating repeated human intervention in the process.

Single character recognition has achieved accuracy levels on the order of ninety-nine percent. In some applications, however, such as mail processing, outside influences can reduce the scanning quality of images to cause characters to become touching or separated. These modified characters must be identified and either combined or separated in order to correspond to the actual input data. If not handled properly, these scanning imperfections will cause character recognition rates to drop significantly, requiring additional processing to return the localized character image to a state similar to the original or classify the imperfect character image so that it can be mapped to a single-character classifier.

SUMMARY OF THE INVENTION

To this end, in accordance with one aspect of the invention, a method is disclosed for refining character segmentation in an optical character recognition system receiving as input a plurality of candidate objects. Each candidate object below a threshold character width is merged with another candidate object at one or more merge lines to form a composite object. The plurality of candidate objects are preclassified to identify a plurality of composite objects and a plurality of character portions. One or more proposed split lines are determined for each of the composite objects at which the composite object may be segmented.

Regions are defined within each of the composite objects from the position of the merge and split lines. The defined regions within each composite object are classified to obtain an associated score for each region. A number of complete region sets are defined for each composite object, each with an associated set ranking determined from the associated score of the regions comprising the set. The set having the highest ranking is selected for each composite object.

In accordance with another embodiment of the invention, a computer program product, operative in a data processing system, is disclosed for refining character segmentation in an optical character recognition system receiving as input a plurality of candidate objects. The computer program product includes an object merger that merges each candidate object below a threshold character width with another candidate object at one or more merge lines to form a composite object. An object preclassifier that classifies the plurality of candidate objects to identify a plurality of composite objects and a plurality of character portions. A fine segmentation portion that proposes one or more split lines for composite objects.

A region formation portion defines regions within each of the composite objects from the position of the merge and split lines. A region preclassifier classifies the defined regions within each composite object to obtain an associated score for each region. A region evaluation portion defines a number of complete region sets for each composite object, each with an associated set ranking determined from the associated score of the regions comprising the set. The region evaluation portion then selects the set having the highest ranking for each composite object.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4(*a*) is a decision tree illustrating the combination of regions into complete sets provided in FIG. 3;

FIG. 4(*b*) is a table showing the available regions sets for the example composite object illustrated in FIG. 3.

DETAILED DESCRIPTION OF THE INVENTION

It should be noted that the present invention and any image recognition classifier to which the present invention is applied will likely be implemented as a computer program. Such a program may simulate, at least in part, the functioning of a neural network. As the present invention will be implemented as part of an optical character recognition system, a basic description of such a classification system would be useful in illustrating the claimed invention.

Figure 1:
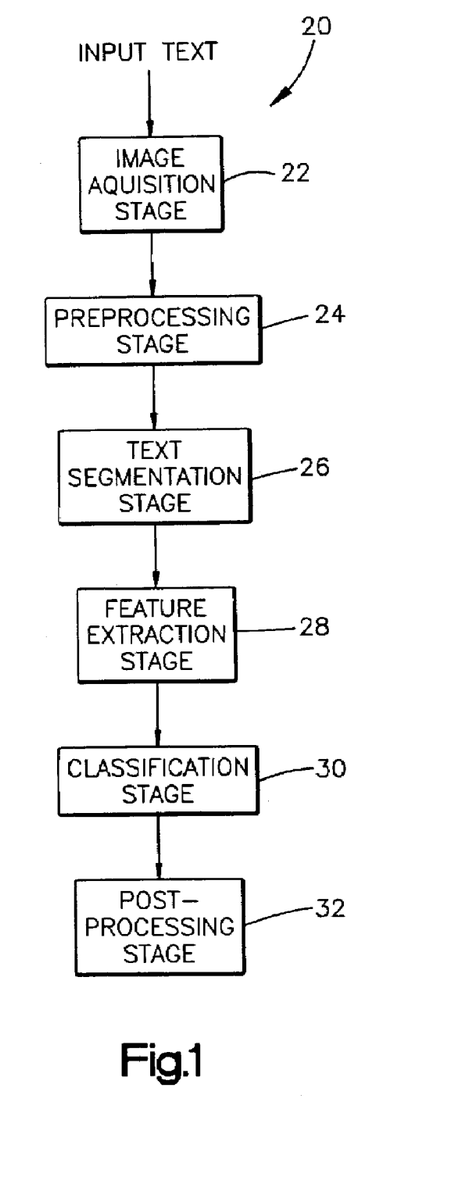
FIG. 1 illustrates a simplified example of an optical character recognition system that might be used in association with the present invention.

FIG. 1 illustrates a simplified example of an optical character recognition system 20 that might be used in association with the present invention. As stated above, the system is often implemented as a software program. Therefore, the structures described herein may be considered to refer to individual modules and tasks within that program.

Focusing on the function of an optical character recognition system 20, the classification process begins at an image acquisition stage 22 with the acquisition of an input image. In an optical character recognition system, the image will usually represent a quantity of text. The text is then sent to a preprocessing stage 24, where the text is preprocessed to enhance the text image, eliminate obvious noise, and otherwise prepare the text block for further processing.

The preprocessed text is then sent to a text segmentation stage 26. Segmentation is necessary to divide the text into units that roughly correspond to the output classes of the classification system. For example, a typical OCR system is trained to recognize single characters. Thus, the text segmentation stage 26 attempts to divide the text at the boundaries of the characters.

The segmented characters are then sent to a feature extraction stage 28. Feature extraction converts the segmented characters into a vector of numerical measurements, referred to as feature variables. The vector is formed from a sequence of measurements performed on the image. Many features exist and are selected based on the characteristics of the recognition problem. The extracted feature vector is then provided to a classification stage 30. The classification stage 30 relates the feature vector to the most likely output class and determines a confidence value that the image is a member of the selected class. This is accomplished by a statistical or neural network classifier. The confidence value provides an external ability to assess the correctness of the classification. For example, a confidence value may have a value between zero and one, with one representing maximum certainty. Finally, the recognition result is sent to a post-processing stage 32. The post-processing stage 32 applies the recognition result provided by the classification stage 30 to a real-world problem.

Figure 2:
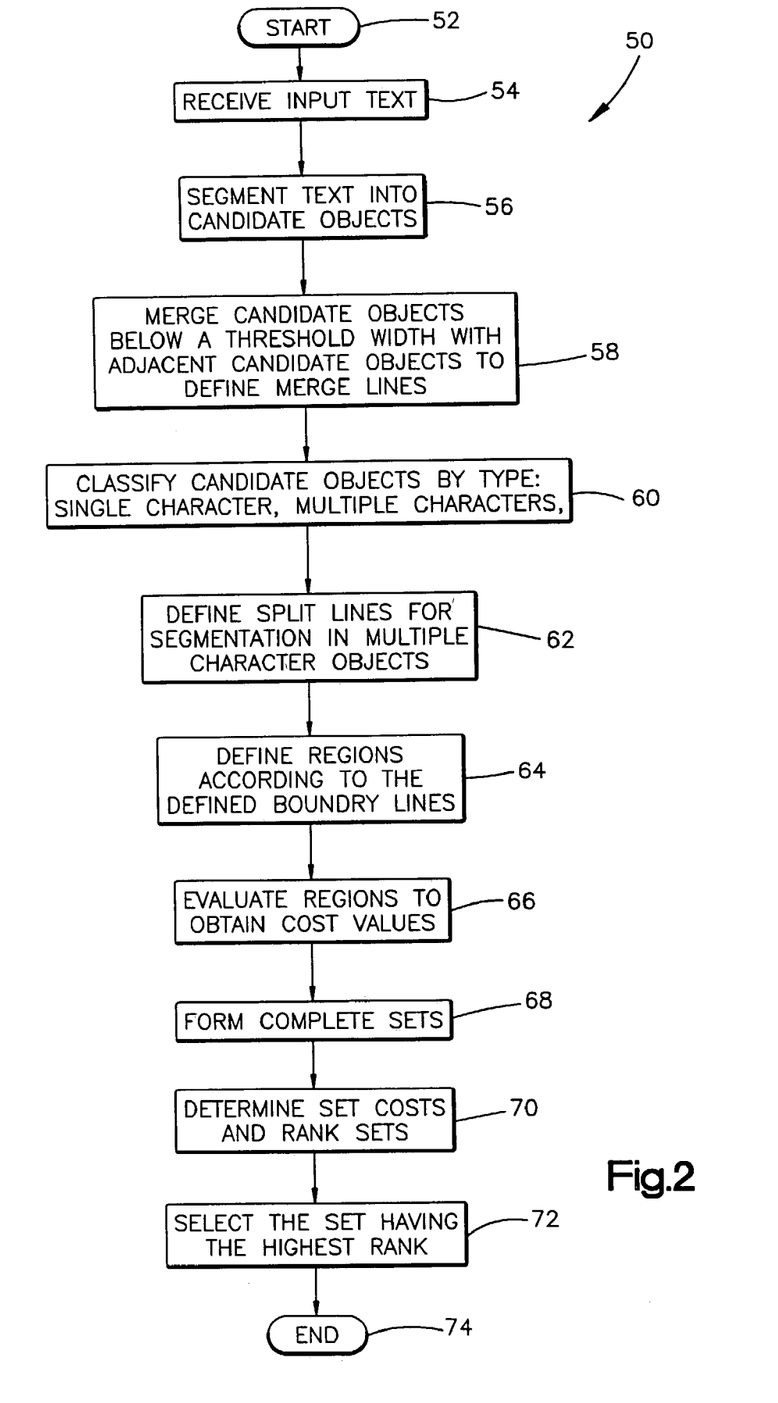
FIG. 2 is a flow diagram illustrating the run-time operation of the text segmentation device of the present invention.

FIG. 2 is a flow diagram illustrating the run-time operation of the text segmentation device of the present invention. The process 50 begins at step 52. The process then proceeds to step 54, where the system receives a quantity of text for analysis. The text will generally be binarized, consisting of a number of rows and columns of dark and light pixels. A preliminary segmentation of the text is performed at step 56. During the preliminary segmentation, the text is segmented into candidate objects by segmenting any characters separated by a line of light pixels. Accordingly, the preliminary segmentation is relatively straightforward, and a number of methods are available in the art for performing this segmentation. Generally speaking, however, the preliminary segmentation will fail to segment characters that are touching and improperly segment characters with slight breaks of white space within their contour. Thus, candidate objects will be present consisting of single characters, portions of characters, and multiple characters. Because candidate objects containing multiple characters represent a composite of two or more characters or character parts, they will be referred to hereinafter as composite objects.

The process continues at step 58, where any candidate objects too small to be single characters (i.e. broken characters) are joined with adjacent candidate objects at a merge line to form a single candidate object. A merge line is merely a recorded boundary marking a proposed merger of two candidate objects. Portions of characters are only joined where the contour of the characters (i.e. the lines and strokes comprising the characters) are sufficiently close to one another across the break. This helps to ensure that the break is artificial, as opposed to a natural break between characters. Because of the potential for joining multiple characters at this step, any such joined objects will be considered composite objects for the purposes of later analysis.

The process continues at step 60, where the system classifies the newly segmented candidate objects. At this stage, the classifier merely identifies whether a particular candidate object comprises a single character or multiple characters. Basically, the preclassifier determines whether to accept a candidate object as a character or process it as a touching character sequence. In the example embodiment, certain touching character sequences may be recognized as such here and classified as its composite characters. Multiple classifiers utilizing varying classification techniques may be used to identify the various categories of objects.

The process continues at step 60, where any identified portions of characters (i.e. broken characters) are joined with adjacent candidate objects at a merge line. A merge line is merely a recorded boundary marking a proposed merger of two candidate objects. Portions of characters are only joined where the contour of the characters (i.e. the lines and strokes comprising the characters) are sufficiently close to one another across the-break. This helps to ensure that the break is artificial, as opposed to a natural break between characters. An identified candidate object may be merged with any neighboring candidate object providing they have sufficiently similar contours and meet merging related thresholds. This includes other identified character portions, composite objects, and even candidate objects preclassified as single characters. Because of the potential for joining multiple characters at this step, any such joined objects will be considered composite objects for the purposes of later analysis.

It should be noted that the present method merges any identified partial character pieces prior to invoking the segmentation algorithm. This has the advantage of eliminating the need to search for merged pieces after segmentation. Under the present system, even multi character pieces with partial character data contained on either their left or right edge will be merged and subsequently separated. Prior merging solutions contained in literature have attempted to only merge together pieces that are narrow in width. Such methods fail when the merge pieces consist of more than one character since it would appear this item is too wide for merging.

The process continues at step 62, where one or more split lines are defined within each composite object. This split line generation approach is based on the premise that a "correct" split path will be generated between any touching character sequence. It then relies on classification logic to rank the split possibilities such that the correct split region(s) will be retrieved based on their relative set cost.

Since the application of the example embodiment involves the processing of millions of mail pieces from many countries on a daily basis, it must be able to recognize a nearly limitless amount of font styles and typefaces including serif, sans serif, italics, etc. Nuances between these font styles force this segmentation to be robust such that the correct split will likely be generated, but this also means that several possible paths through the space must be generated including paths which will not always be useful. The approach of allowing several potential split paths allows the system to segment correctly nearly any font type since at any step, absolute choices are not forced. Instead, a myriad of choices are generated, and the classifier determines which are most applicable.

The split lines can be defined via a number of methods, including placing vertical boundary lines at predetermined positions or by dividing the composite object into columns and splitting at the columns having the fewest dark pixels. In the example embodiment, the split lines are established using a combined pixel/profile projection and least cost algorithm.

Figure 3:
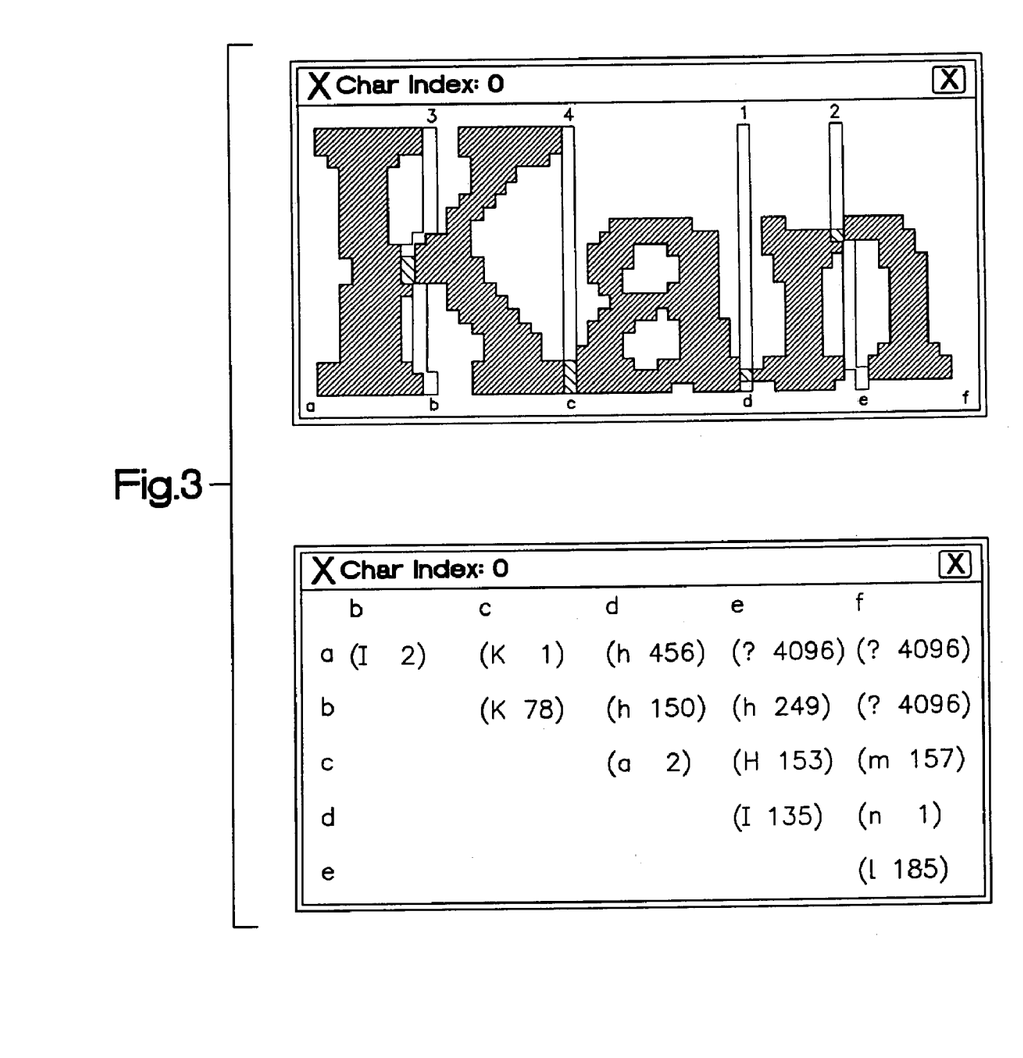
FIG. 3 illustrates an example composite object with four defined boundary lines and a list of the regions created by these boundary lines.

The process then progresses to step 64, where the system defines a plurality of regions within each composite object. The defined regions represent each possible combination of split and merge lines, collectively referred to as interior boundary lines, within the composite object. An example composite object, with four interior boundary lines is illustrated in FIG. 3. The interior boundaries are labeled "b", "c", "d", and "e" for later reference. Similarly, the left and right exterior boundaries of the composite object are labeled "a" and "f" respectively.

A region is defined as the area between any two interior boundary lines, any interior boundary line and an exterior boundary, or the area between the two exterior boundaries. For a composite object containing a total of X interior boundary lines, where X is an integer less than a maximum allowed number of paths, the number of possible regions, $R_D$, can be determined as follows:

$$R_D = \frac{(X+2)(X+1)}{2} \qquad \text{Equation 1}$$

The system will define and evaluate all possible regions that may be formed from within the composite object. In the example of FIG. 3, fifteen regions will be created and stored by the system. Generally, the number of interior boundary lines will be fairly small, making it unnecessary to store an exceedingly large number of regions.

Once the regions are defined and stored, the process continues to step 66, where the regions within each composite object are evaluated using one or more recognition classifiers. In the example embodiment, these classifiers include a linear classifier and a neural network classifier, but can be extended to an n-based classifier. Having multiple types of classifiers allows for a "boosting" process, which strengthens our overall classification system. Since these classifiers are used to classify the individual regions prior to the actual classification of the composite object, where multiple classifiers are present they will be referred to collectively hereinafter as the region preclassifier.

The individual regions are identified by the region preclassifier, which is trained to recognize a plurality of output classes according to a number of predefined features. Potentially useful features include the area of the region, the location of the top and bottom contours defined by the black pixels, the width of the region, and the number of transitions that an interior boundary line of the region makes from black to white pixels. In the example embodiment, the region preclassifier is trained to recognize single characters across a number of machine-printed styles and fonts. Depending on the application, however, a preclassifier specific to a particular font or a preclassifier capable of classifying multi-character units may be preferable.

Each region, upon classification, becomes associated with a particular character and a score computed by the preclassifier. In the example embodiment, the score is a function of the error between an ideal representation of the character stored in memory within the preclassifier and the classified character. FIG. 3 contains a region score table showing the regions formed from the example composite object according to their associated boundary lines as well as the scores and associated output classes for each of the regions.

After the regions are classified, the process continues to step 68, where the regions of each composite object are combined into sets. It should be noted that only complete region sets are considered in this analysis. A complete region set is a set of regions that contains the entire area between the exterior boundaries of a composite object exactly once. For example, a complete set cannot contain both the region bounded by lines "b" and "d" and the region bounded by lines "c" and "e", as this would result in overlap of the area bounded by lines "c" and "d". Likewise, no area of the composite object may be omitted. For a given set of X interior boundary lines, there will be $2^X$ combinations of regions that comprise a complete set. Evaluating only complete sets ensures that necessary data will not be omitted and unnecessarily duplicative data will not be inputted to the classifier to distort later recognition of the composite object.

Figure 4A:
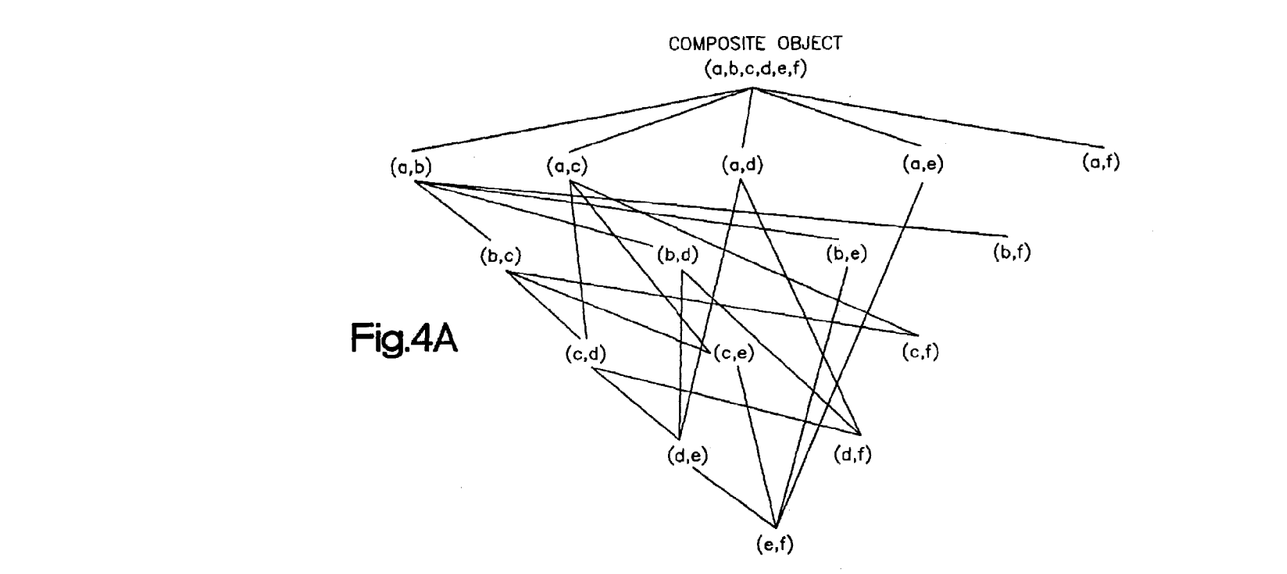
Figure 4B:
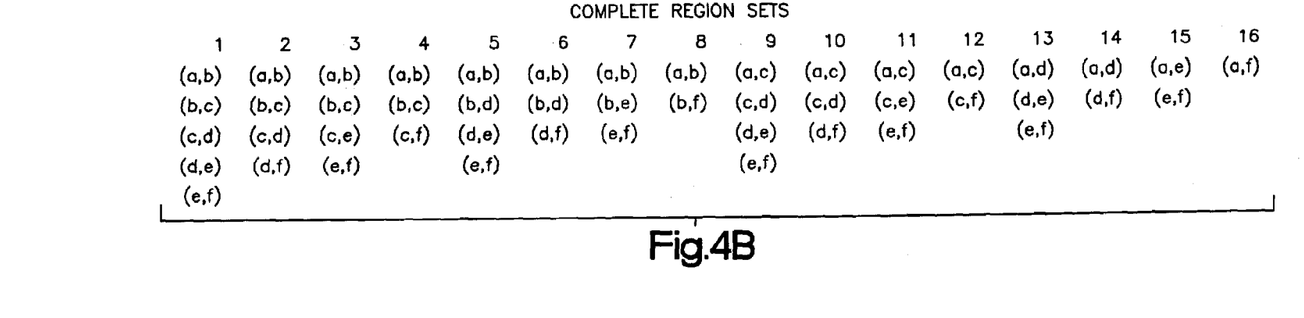

This process is best conceptualized as a decision tree such as is illustrated in FIG. 4(a). In FIG. 4(a), each of the fifteen regions from the example composite object of FIG. 3 is represented by its initial and terminal boundary. Each of the regions in the first row, all of which begin at "a", the left boundary, begins a complete region set. The regions will be referred to as root nodes of the decision tree. Each of the regions on the right side, all of which end on "f", the right boundary, provide the final region of a complete region set. These will be referred to as leaf or terminal nodes of the decision tree. Any path beginning at a root node and proceeding downward to terminate on a leaf node provides a complete set. FIG. 4(b) contains a table showing all of the possible region sets illustrated in the decision tree.

Once the sets are formed, the process continues to step 70, where an associated set score is derived from the scores values associated with the regions comprising the set. This can be accomplished via a number of formulas, depending on the application. In the example embodiment, the set score is merely the sum of the associated scores of the regions comprising the set. In an alternate embodiment, the set score may be derived from a weighted linear combination of the associated scores of the regions of the set. The sets are then ranked according to their associated set score.

Once the set scores are calculated, the process proceeds to step 72, where the system selects the highest ranked set from each composite object as the preferred segmentation for the composite object. This is the segmentation that will be transmitted to a pattern recognition classifier. The method of ranking will depend on the calculation of the associated score of the regions. In the example embodiment, increased scores reflect low confidence in the preclassification of the regions, and the system will select the set having the lowest score. The process then terminates at step 74.

Figure 5:
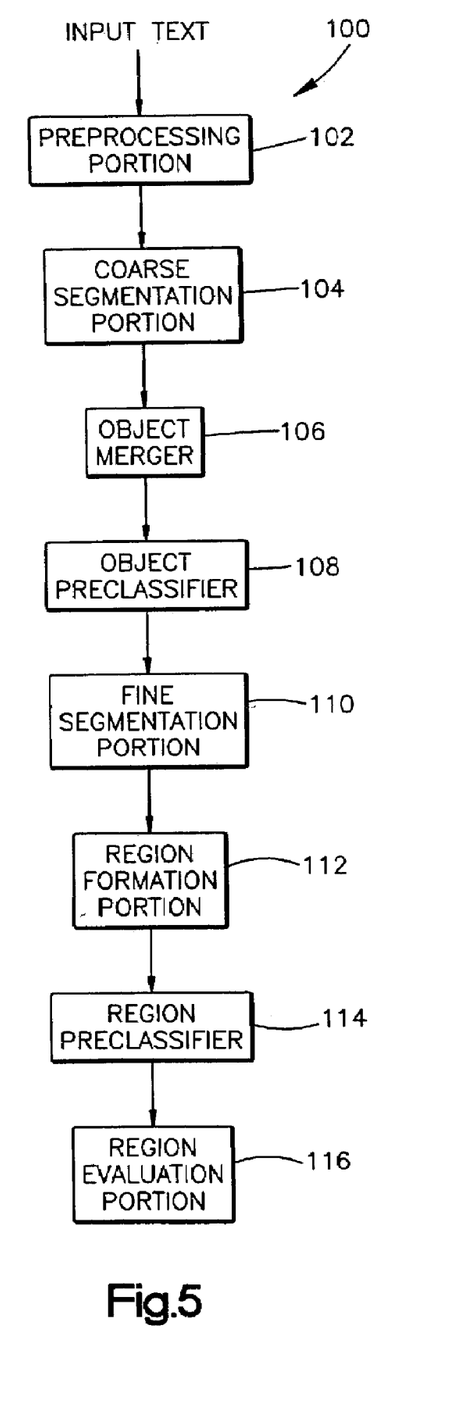
FIG. 5 is a functional block diagram of an example embodiment of the present invention implemented within an optical character recognition system for processing mail articles.

FIG. 5 illustrates an example embodiment 100 of the invention implemented as a computer program running on a data processor within a mail-processing system. It will be understood that the components shown in FIG. 5 are merely functional representations of routines and functions within the computer program. Further, functions that are carried out by the computer program, but not helpful in understanding the claimed invention, will not be shown in this diagram. A functional program, for example, would require some amount of temporary memory and routines for accessing this memory. Such matters are understood by those skilled in the art and they are omitted in the interest of brevity.

Turning to FIG. 5, a quantity of text, representing a mailing address, is scanned from a mailed envelope and received at a preprocessing portion 102. The preprocessing portion 102 removes obvious noise from the text and converts it to a binary image consisting solely of uniform light and dark pixels. The preprocessed images are then passed to a coarse segmentation portion 104 that divides the text into lines, and then further divides the lines into candidate objects. The candidate objects are then passed to an object merger 106.

The classified candidate objects are then provided to a object merger 106. The object merger 106 attempts to combine any objects that are too small to be single characters with adjacent candidate objects. Only objects having contours that are both horizontally and vertically close to the contour of the character portion will be considered for merger. In other words, the system establishes both a vertical and a horizontal threshold for merger. When candidate objects are merged, the boundary between them is recorded as a merge line. To ensure that the candidate objects were properly merged, the newly created combination is treated as a composite object and subjected to the same segmentation analysis as touching characters.

The classified candidate objects are then provided to a object preclassifier 108. The object preclassifier 108 may consist of multiple neural network or statistical classification systems. At least one classifier classifies each candidate object as either a single character or an object containing multiple characters. Where an object is identified as containing multiple characters or is too wide to be a single character, it is considered a composite object and is retained for fine segmentation. Similarly, where a letter is identified as a single character, but with a classification confidence lower than a threshold value, the character is classified as a composite object and subjected to fine segmentation.

In the example embodiment, the object preclassifier 106 includes a neural network classifier trained to compare a candidate object with a plurality of output classes and output the output class associated with the object and an associated confidence value. These output classes include commonly combined and broken characters over a number of character fonts. Where the object preclassifier cannot identify the character with a reasonable degree of confidence, the system treats each block as a composite object, considering the block for the merger and fine segmentation functions discussed below.

Segmentation, even by the method of the present invention, frequently results in errors when dealing with particular difficult touching sequences. In the example embodiment, the preclassifier includes the ability to recognize several letters simultaneously without separation. At least one classifier within the object preclassifier 108 is trained to recognize these character sequences directly, just as it would a single character. This is intended as a specific classifier for accommodating particularly stubborn touching character sequences. Examples of these difficult character sequences include "fi","ff", "ffi", "rn", "rt", "tt", and "TT"

For example, one output class of the system will represent the character pair "tt", a common touching character sequence. Where the confidence of the classification meets a threshold value, representing a reasonable degree of confidence, the object preclassifier 106 will identify the object as belonging to one of the three main output classes. For example, if the classifier produces a reasonable confidence that the candidate object comprises the touching letters "tt", the object will be classified as a composite object and the actual output will correspond to "t","t".

Composite objects are provided to a fine segmentation portion 110. The fine segmentation portion 110 determines appropriate locations at which to define split lines within each of the composite objects. In the example embodiment, this is accomplished via a least cost path algorithm adjusted by pixel and profile projections. In the least cost path algorithm of the example embodiment, the composite object is divided into an interior portion and an exterior portion. The division between these portions is determined as the uppermost contour defined by the dark pixels within the composite object. The calculation of least cost begins at the bottom boundary of the composite object image and proceeds upward to the upper boundary in increments of one pixel. Accordingly, all split lines drawn in the present invention will be roughly vertical, running between the upper and lower boundaries of the composite object. The determined boundary line may progress from a starting pixel in only three directions, either toward the pixel on its upper left, the pixel immediately above it, or the pixel on its upper right. As would be apparent, where the line reaches a pixel on the left or right boundary, the options for movement drop to two directions, as the line cannot leave the boundaries of the composite object image.

Each pixel has an associated cost. For example, light pixels will have a lower cost than dark pixels to discourage excessive segmentation of the characters. Similarly, the cost of a pixel will be affected by whether the pixel is located within the interior or the exterior portion of the composite object. The cost of each movement between pixels is a function of the cost of the pixel and the direction of movement. For example, diagonal movements are defined to be more expensive than vertical movements. This has the effect of keeping the split lines roughly vertical. Data from this calculation will be retained for evaluating the regions, as the number of crossings of a boundary line through separated black pixel regions, the total black pixel count within the line, and the path curvature are considered in the region score.

The fine segmentation portion 110 represents the image as a cost matrix. The construction of the cost matrix begins by filling the bottom row with the appropriate pixel costs. Each pixel in the next row of the matrix is assigned the smallest total cost value necessary to reach that pixel. Each pixel can only be reached from the three pixels beneath it in the previous row, so the system evaluates the cost of moving to the new pixel from each of those positions. Since each pixel of the previous row already contains the minimum cost necessary to reach it, the total cost at each new pixel may be defined by adding the cost of the new move to the previous values of each of the three starting pixels, and selecting the minimum total cost.

Once the cost matrix is filled, the system will determine one or more paths of lowest cost. In the example embodiment, paths are weighted as to their distance from the left and right boundaries to discourage trivial paths at the boundaries. Paths drawn near an existing merge or split line are similarly weighted. The paths are selected by selecting the pixel in the top row with the smallest cost value and tracing the determined low cost path back to the bottom row. When the first lowest cost path is selected, the values of the other paths are weighted according to their proximity to the new line. This continues until the cost of new lines exceeds a predetermined cost value or a predetermined number of the best lines may be selected.

The selected split and merge lines, collectively referred to as interior boundary lines, divide each composite object into a number of roughly rectangular sections. A region formation portion 112 defines a number of regions, with a region being defined as the area defined by any two boundary lines, including the left and right exterior boundaries of the composite object. The region formation portion 112 creates a separate image of each region and sends them a region preclassifier 114.

At the region preclassifier 114, the various regions of each composite object are classified and assigned both an output class and an associated score. In the example embodiment, the region preclassifier 114 comprises several individual pattern recognition classifiers. These classifiers include a linear classifier and a neural network classifier, but can be extended to an n-based classifier. Having multiple types of classifiers allows for a "boosting" process, which strengthens the overall classification system.

Once a score value has been determined for each region, the regions of each composite object are formed into complete region sets by a region evaluation portion 116. The region evaluation portion 116 then assigns to each complete region set an associated set score. In the example embodiment, the set score of a complete region set is calculated by summing the associated score values of each of the regions in the set. The various complete sets formed from each composite object are then ranked according to their set score, with the sets with the lowest set score receiving the highest ranking in the example embodiment. The highest-ranking set is selected as the proper segmentation for the composite object.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, the following is claimed:

1. A method for refining character segmentation in an optical character recognition system receiving as input a plurality of candidate objects, comprising:
   merging each candidate object below a threshold character width with another candidate object at one or more merge lines to form a composite object;
   preclassifying the plurality of candidate objects such that each of the plurality of candidate objects is determined to be one of an identified single character, an identified composite object, and an unidentified composite object, such that a plurality of unidentified composite objects are outputted;
   determining one or more proposed split lines for each of the unidentified composite objects at which the composite object may be segmented;
   defining regions within each of the unidentified composite objects from the position of the merge and split lines;
   classifying the defined regions within each unidentified composite object to obtain an associated score for each region;
   defining a number of complete region sets for each unidentified composite object, each with an associated set ranking determined from the associated score of the regions comprising the set; and
   selecting the set having the highest ranking for each unidentified composite object.

2. A method as set forth in claim 1, wherein each of the composite objects has an upper boundary and a lower boundary, and the determined split lines run between the upper boundary and the lower boundary.

3. A method as set forth in claim 1, wherein the step of determining at least one split line includes assigning an associated cost to a plurality of possible split lines and selecting the split line with the lowest associated cost.

4. A method as set forth in claim 1, wherein the candidate objects represent portions of a mailing address, digitally scanned from a mailed envelope.

5. A method as set forth in claim 1, wherein the associated set ranking for each complete region set is determined by summing the associated score values of the regions within the set.

6. A method as set forth in claim 1, wherein the step of merging character portions with other candidate objects includes determining the proximity of the contour of the character portion to the contour of the other candidate object and comparing it to a predetermined threshold value.

7. A method as set forth in claim 6, wherein the step of merging character portions with other candidate objects includes determining the proximity of the contour of the character portion to the contour of the other candidate object in both a vertical and a horizontal direction and comparing both the vertical proximity and the horizontal proximity to respective predetermined thresholds.

8. A method as set forth in claim 1, wherein the step of merging each character portion with adjacent candidate objects takes place prior to the step of determining proposed split lines for each of the composite objects.

9. A computer program product, operative in a data processing system and stored on a computer readable medium, for refining character segmentation in an optical character recognition system receiving as input a plurality of candidate objects, comprising:
   an object merger that merges each candidate object below a threshold character width with another candidate object at one or more merge lines to form a composite object;
   an object preclassifier that classifies the plurality of candidate objects such that each of the plurality of candidate objects is determined to be one of an identified single character, an identified composite object, and an unidentified composite object, such that to identify the object preclassifier outputs a plurality of composite objects and a plurality of character portions;
   a fine segmentation portion that determines one or more proposed split lines for at least one of the unidentified composite objects at which the at least one unidentified composite object may be segmented;
   a region formation portion that defines regions within each of the unidentified composite objects from the position of the merge and split lines;
   a region preclassifier that classifies the defined regions within each unidentified composite object to obtain an associated score value for each region; and
   a region evaluation portion that defines a number of complete region sets for each unidentified composite object, each with an associated set ranking determined from the associated score of the regions comprising the set and selects the set having the highest ranking for each unidentified composite object.

10. A computer program product as set forth in claim 9, wherein each of the composite objects has an upper boundary and a lower boundary, and the determined boundary lines run between the upper boundary and the lower boundary.

11. A computer program product as set forth in claim 9, wherein the fine segmentation portion, in determining at least one split line, assigns an associated cost to a plurality of possible split lines and selects the split line with the lowest associated cost.

12. A computer program product as set forth in claim 9, wherein the computer program product is implemented as part of a mail processing system.

13. A computer program product as set forth in claim 9, wherein the associated ranking for each complete region set is determined by summing the associated score values of the regions within the set.

14. A computer program product as set forth in claim 9, wherein the merger portion determines the proximity of the contour of the character portion to the contour of the other candidate object and compares it to a predetermined threshold value.

15. A computer program product as set forth in claim 14, wherein the merger portion determines the proximity of the contour of the character portion to the contour of the other candidate object in both a vertical and a horizontal direction and compares both the vertical proximity and the horizontal proximity to respective predetermined thresholds.

16. A computer program product as set forth in claim 9, wherein the object merger merges each character portion with adjacent candidate objects before the fine segmentation portion determines proposed split lines for each of the composite objects.

* * * * *